(No Model.)
W. J. SUTTIE.
SPECTACLE TEMPLE.
No. 372,437. Patented Nov. 1, 1887.
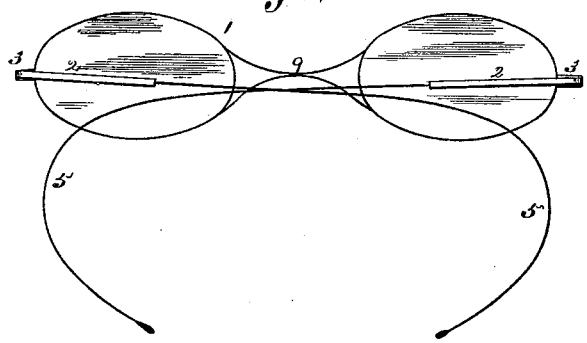
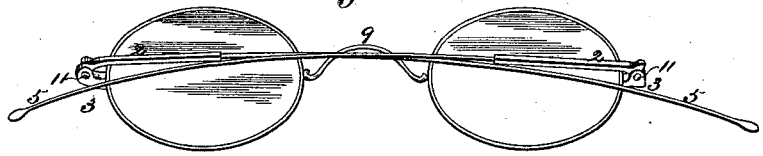
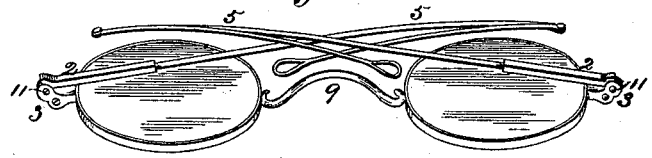
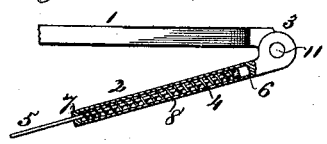
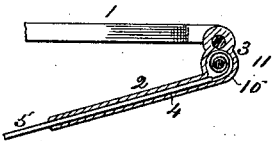
Attest:
Hervey B. Knight
Emma Arthur.
Inventor:
William J. Suttie
By Knight & Bro.
Attys.

UNITED STATES PATENT OFFICE.

WILLIAM JOS. SUTTIE, OF ST. LOUIS, MISSOURI.

SPECTACLE-TEMPLE.

SPECIFICATION forming part of Letters Patent No. 372,437, dated November 1, 1887.

Application filed April 9, 1887. Serial No. 234,278. (No model.)

*To all whom it may concern:*

Be it known that I, WILLIAM JOS. SUTTIE, of the city of St. Louis, in the State of Missouri, have invented a certain new and useful Improvement in Spectacle-Temples, of which the following is a full, clear, and exact description, reference being had to the accompanying drawings, forming part of this specification.

The improvement consists in making the temples extensible by forming one part to slide in a socket of the other part, a spring being concealed in the socket to check the extension. The construction is such that the temple will accommodate itself to the wearer and will adapt itself to the motions of the head, thereby avoiding the pull on the nose resulting from the movement of the facial muscles.

Figure I is a view of a pair of spectacles whose temples engage behind the ears. Fig. II shows temples slightly curved. Fig. III shows jointed temples. Fig. IV is an enlarged detail section showing the concealed spring. Fig. V is an enlarged detail section showing a modification.

The improvement is applicable to spectacles of all styles.

The frame 1 contains no novel feature. 2 is a socket-piece jointed to the ear 3 in the usual manner. The socket 4 of the piece 2 is square or otherwise non-circular, and the other part, 5, of the temple has a head, 6, at its inner end, fitting the socket, so that, while it admits of endwise motion therein, it cannot turn. The outer end, 7, of the socket is contracted to fit the part 5.

8 is a spiral spring, one end of which bears against the end 7 of the socket, and whose other end bears against the head 6, so as to tend to force the head 6 inward in the socket. The spring is of such a strength that it will hold the spectacles snugly to place, but will not cause the bridge 9 of the frame to bear with unnecessary force against the nose.

It will be seen that the temples will accommodate themselves to the length of the person's head, and also accommodate themselves to any facial movement. This is more especially necessary in the styles of temples shown in Figs. I and III, which engage behind the ears.

In the modification shown in Fig. V the socket is made to fit snugly the squared end of the part 5, and this part ends in a coiled spring, 10, attached to or simply coiled around the pivot 11.

I claim as my invention—

1. A spectacle-temple made in two parts connected by an extension-joint with a contractile spring, substantially as and for the purpose set forth.

2. A temple for spectacles, one of which contains a socket in which the other part works, and a spring contained in the socket, which acts to contract the temple at the joint.

3. A spectacle temple having two parts connected by a slip joint, one part having a non-circular socket containing a spiral spring, and the other part having a head working in the socket and pushed inward by the spiral spring, substantially as and for the purpose set forth.

WILLIAM JOS. SUTTIE.

In presence of—
SAML. KNIGHT,
BENJN. A. KNIGHT.